United States Patent
Coleman et al.

(10) Patent No.: US 9,875,091 B1
(45) Date of Patent: *Jan. 23, 2018

(54) USER-INITIATED SOFTWARE APPLICATION DEPLOYMENT TO AN ORBITAL SATELLITE PLATFORM

(71) Applicant: Vector Launch Inc., Tucson, AZ (US)

(72) Inventors: Shaun Coleman, San Jose, CA (US); Darren D. Garber, Rancho Palos Verdes, CA (US)

(73) Assignee: Vector Launch Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,837

(22) Filed: Jun. 30, 2017

Related U.S. Application Data

(63) Continuation of application No. 15/353,411, filed on Nov. 16, 2016, now Pat. No. 9,740,465.

(51) Int. Cl.
  *G06F 9/445* (2006.01)
  *G06F 9/44* (2006.01)
  *G06F 3/0482* (2013.01)

(52) U.S. Cl.
  CPC ............ *G06F 8/60* (2013.01); *G06F 8/71* (2013.01); *G06F 3/0482* (2013.01)

(58) Field of Classification Search
  CPC .................................. G06F 8/60; G06F 8/71
  USPC ........................................ 717/121, 168–178
  See application file for complete search history.

(56) References Cited

U.S. PATENT DOCUMENTS

| | | | |
|---|---|---|---|
| 5,724,345 A | 3/1998 | Guarneri et al. | |
| 5,886,991 A | 3/1999 | Guarneri et al. | |
| 7,151,929 B1 | 12/2006 | Jenkin et al. | |
| 7,463,890 B2 | 12/2008 | Herz et al. | |
| 7,992,134 B2 | 8/2011 | Hinchey et al. | |
| 8,140,816 B2 | 3/2012 | Hofer et al. | |
| 8,286,187 B2 | 10/2012 | Hou et al. | |
| 8,706,869 B2 * | 4/2014 | Campion | G06F 9/5066 709/219 |

(Continued)

FOREIGN PATENT DOCUMENTS

WO    1996003823 A1    2/1996

OTHER PUBLICATIONS

Panunzio, Marco et al. "An Architectural Approach with Separation of Concerns to Address Extra-Functional Requirements in the Development of Embedded Real-Time Software Systems." Department of Mathematics, University of Padova, Italy. Journal of Systems Architecture 60, 770-781 (2014).

(Continued)

*Primary Examiner* — Francisco Aponte

(57) ABSTRACT

Systems, methods, and software described herein provide enhancements for deploying software applications in satellites. In one example, a control system may receive user input indicative of deployment requirements for a software application, and identify an availability of resources present in a plurality of satellites deployed as an orbiting satellite platform. The control system further determines deployment options for deployment of the software application based on the deployment requirements and the availability of resources in the plurality of satellites, and provides the deployment options for the software application via a user interface for deployment of the software application onto the orbiting satellite platform.

20 Claims, 12 Drawing Sheets

(56) References Cited

U.S. PATENT DOCUMENTS

| | | |
|---|---|---|
| 8,730,864 B2 | 5/2014 | Natarajan et al. |
| 8,797,969 B1 | 8/2014 | Harel et al. |
| 8,819,659 B2 | 8/2014 | Ramer et al. |
| 9,014,241 B2 | 4/2015 | Dick |
| 9,042,295 B1 | 5/2015 | Balter et al. |
| 9,442,476 B2 | 9/2016 | Bliss et al. |
| 9,577,704 B2 | 2/2017 | Balter et al. |
| 9,641,238 B1 | 5/2017 | Coleman et al. |
| 9,654,204 B2 | 5/2017 | Ling et al. |
| 2002/0104920 A1 | 8/2002 | Thompson et al. |
| 2003/0203717 A1 | 10/2003 | Chuprun et al. |
| 2005/0050538 A1 | 3/2005 | Kawamata et al. |
| 2005/0124332 A1 | 6/2005 | Clark et al. |
| 2005/0143005 A1 | 6/2005 | Moore |
| 2005/0262495 A1 | 11/2005 | Fung et al. |
| 2006/0112383 A1 | 5/2006 | Chang et al. |
| 2006/0130056 A1 | 6/2006 | Bozak et al. |
| 2007/0221787 A1 | 9/2007 | McKinnon et al. |
| 2007/0271560 A1 | 11/2007 | Wahlert et al. |
| 2008/0147675 A1 | 6/2008 | Engehausen et al. |
| 2008/0247351 A1 | 10/2008 | Dankberg et al. |
| 2012/0197552 A1 | 8/2012 | Robinson et al. |
| 2013/0141307 A1 | 6/2013 | Nurnberger et al. |
| 2013/0275975 A1* | 10/2013 | Masuda ................ G06F 9/5077 718/1 |
| 2013/0305218 A1 | 11/2013 | Hirsch et al. |
| 2014/0068546 A1* | 3/2014 | Balasubramanian ..... G06F 8/61 717/104 |
| 2014/0201218 A1 | 7/2014 | Catalano et al. |
| 2014/0297874 A1* | 10/2014 | Matsubara ........ G06F 17/30386 709/226 |
| 2015/0078178 A1 | 3/2015 | Carides et al. |
| 2015/0199197 A1 | 7/2015 | Maes et al. |
| 2015/0215030 A1 | 7/2015 | Moore |
| 2015/0219744 A1 | 8/2015 | Eikenberry et al. |
| 2015/0247928 A1 | 9/2015 | Waters et al. |
| 2015/0318916 A1 | 11/2015 | Gopal et al. |
| 2016/0009425 A1* | 1/2016 | Thompson ........... B64G 1/1085 244/158.5 |
| 2016/0037434 A1 | 2/2016 | Gopal et al. |
| 2016/0132805 A1 | 5/2016 | Delacourt et al. |
| 2016/0226150 A1 | 8/2016 | Paleta et al. |
| 2016/0242024 A1* | 8/2016 | Karren ................ G06F 21/6218 |
| 2016/0283424 A1 | 9/2016 | Richardson |
| 2017/0021947 A1 | 1/2017 | Pellegrino et al. |
| 2017/0026110 A1 | 1/2017 | Richardson et al. |

OTHER PUBLICATIONS

"Describing and Deploying Satellite Behaviors Using Rules-Based Statecharts". Kenneth B. Center. PnP Innovations. 28th Annual AIAA/USU, Conference on Small Satellites (2014).

Romer, Kay et al. "The Design Space of Wireless Sensor Networks." IEEE Wireless Communications, vol. 11, Issue 6, pp. 54-61 (2004).

* cited by examiner

USER-INITIATED SOFTWARE APPLICATION DEPLOYMENT TO AN ORBITAL SATELLITE PLATFORM

RELATED APPLICATIONS

This application is a continuation of, and claims priority to, U.S. patent application Ser. No. 15/353,411, entitled "ORCHESTRATION OF SOFTWARE APPLICATION DEPLOYMENT IN A SATELLITE PLATFORM," and filed Nov. 16, 2016.

BACKGROUND

Satellites can be deployed into orbit to provide various space-based operations, such as military and civilian observation operations, communications operations, navigation operations, weather operations, and research operations. Satellites can include various sensors and communication equipment that are used to perform desired tasks. For example, a weather satellite may include one or more cameras or imaging sensors that can be used to take images of Earth, and communication equipment that can be used to communicate the images to a control system on Earth. Although satellites can be configured to perform these specialized operations, satellites are expensive to create and launch into orbit, especially for organizations that may not require the use of an entire satellite with a large number of sensors, or may not require continuous operations on the satellite. As a result, organizations may avoid the use of satellites, limiting the use of promising satellite technology.

OVERVIEW

Systems, methods, and software described herein provide enhancements for deploying software applications in satellites. In one example, a control system may receive user input indicative of deployment requirements for a software application, and identify an availability of resources present in a plurality of satellites deployed as an orbiting satellite platform. The control system further determines deployment options for deployment of the software application based on the deployment requirements and the availability of resources in the plurality of satellites, and provides the deployment options for the software application via a user interface for deployment of the software application onto the orbiting satellite platform.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
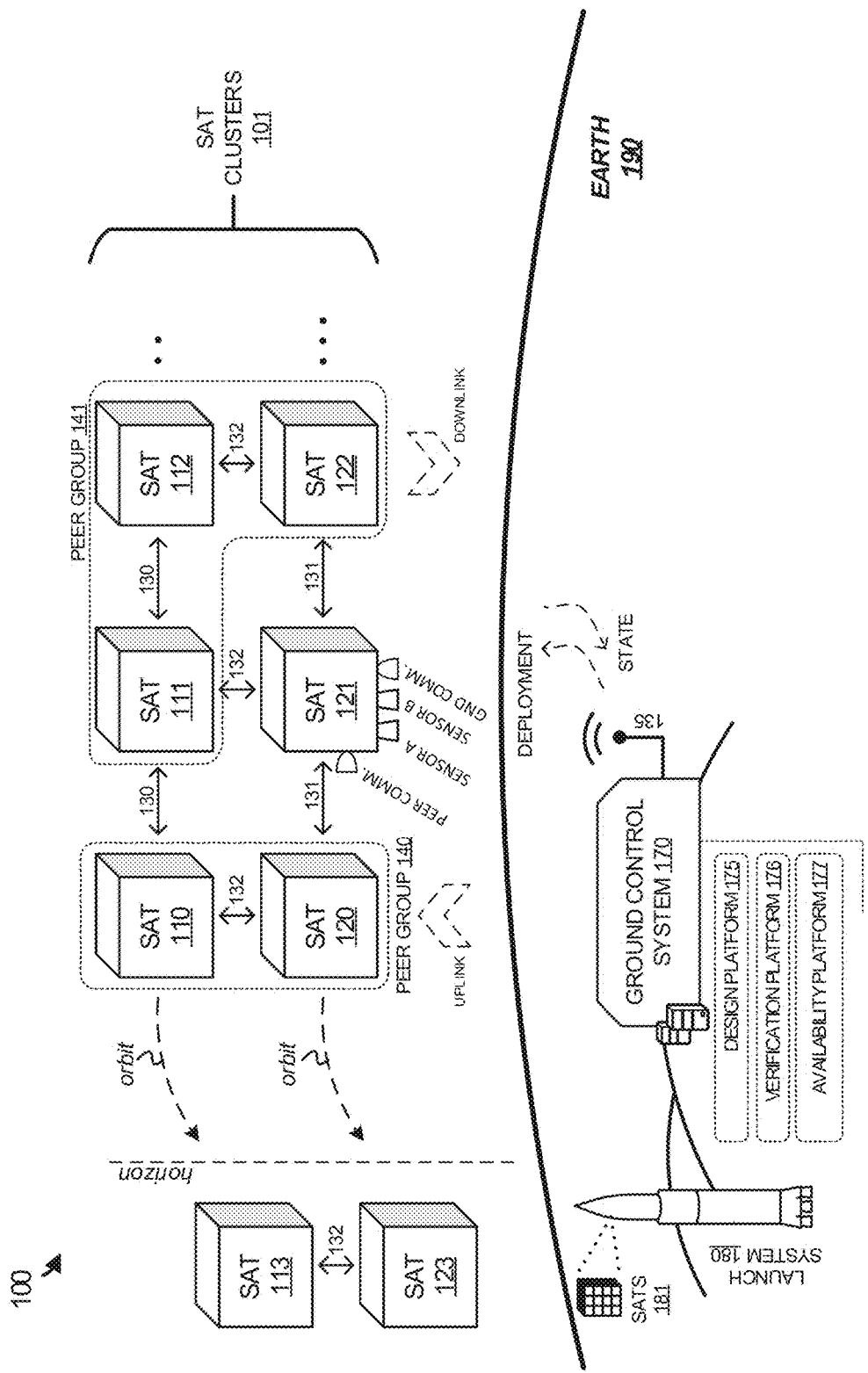
FIG. 1 illustrates a satellite environment according to an implementation.

The various examples disclosed herein provide enhancements for satellite hardware and software technology. In particular, the examples disclosed herein provide systems and methods for deploying software applications to an orbiting satellite platform, wherein each of the software applications executes as a virtual node that can share resources with one or more other applications deployed to the same satellite. These virtual nodes may comprise full operating system virtual machines in some examples, and may further include virtual containers. These containers may include Docker containers, Linux containers, jails, or another similar type of virtual containment node, which can provide an efficient management of resources from a host system. The resources used by the containers may include kernel resources from the host computing system, and may further include repositories and other approved resources that can be shared with other containers or processes executing on the host. However, although resources may be shared between the containers on a host satellite, the containers are provisioned to have private access to the operating system with their own identifier space, file system structure, and network interfaces.

In the present example, to provide the satellite platform, a plurality of satellites may be deployed, wherein organizations may generate applications and deploy the applications to the satellites to perform desired operations. The operations may include military and civilian observation operations, communications operations, navigation operations, weather operations, and research operations. To develop the applications, a development platform may be provided as part of a ground control system that permits the organizations to develop software applications using a development tool. Once developed using the tool, the applications may be executed in a virtual or physical test environment replicating the physical satellite platform. This test environment may permit the user to upload the software application to one or more test satellites and monitor the operation of the application prior to deploying the application to the physical satellite cluster. In some implementations, in developing the application, the provided development tool may include an application programming interface (API) or some other command structure, which permits the applications to request and access the various sensors and interfaces provided by the physical satellite. Accordingly, although each of the software applications may perform different operations, they may interact with sensors, such as cameras, antennas, and the like using similar commands.

Once an application is developed using the development tool and the test environment, the application may then be deployed in one or more satellites of the orbiting satellite platform. In some implementations, the application may be provided to each of the one or more satellites using a ground control system as an uplink to the one or more satellites. In other implementations, a single uplink may be made to a satellite in the platform, wherein the satellite is configured to distribute the application to other desired satellites in the platform. Once deployed in the environment, the application may execute on the assigned satellites.

In some implementations, to manage the execution of the applications on each of the satellites, a schedule may be generated, wherein the schedule may be responsible for scheduling the processing of each of the applications, as well as the access for each of the applications to the user sensors. For example, a first application on a satellite may require access to an imaging sensor during a first-time period, while a second application may require access to the same sensor during a second-time period. The schedule provided to the satellite may be used to determine and allocate addressing links between each of the applications to the sensor based on the defined time periods. In at least one implementation, more than one applications may be allocated to the same sensor at any one time. This may permit applications providing different operations to receive the same data, but provide different functionality in relation to the data. In other implementations, a single application may prefer that no other applications receive are access the sensor at the same time. Thus, the schedule may ensure that only a single application is allocated or capable of communicating with the sensor during the defined time period.

To develop the schedule that is provided to the satellites of the satellite platform, an availability service or platform may be used. In particular, during the development of an application, a developer may provide deployment requirements to the availability platform, which may include geographic areas of interest for the application, operation times of interest, sensor requirements, or some other similar deployment requirements, including combinations thereof. These requirements may then be compared to the available resources of the satellites, wherein the resources may comprise available processing, communication, and sensor resources of each of the satellites, to determine whether the application can be accommodated by the currently orbiting satellites. If the application can be accommodated via the currently orbiting satellites, then the developer may select to deploy the application using the current satellites. In other examples, if only a portion of the deployment requirements could be accommodated, then the developer may be provided with one or more additional selection options for deploying the application.

For example, if the current satellite platform could support eighty percent of geographic area of interest, an option may permit the user to approve or decline the deployment of the application based on whether the eighty percent was adequate for the developer. Accordingly, if the eighty percent were adequate, the application may be deployed to one or more satellites capable of providing the desired operations for the application. In contrast, if the eighty percent were not adequate for the application, then the developer may choose not to deploy the application using the platform, or may choose to add one or more additional satellites to the platform to provide the desired operation. This adding of the satellites may permit the developer to select the various sensors and processing capabilities of the satellite, and deploy the satellite into the required orbit for their operation. Further, once deployed, additional applications may be provided to the new satellite, wherein the new applications may share the physical resources of the satellite with the original application that triggered the deployment of the satellite.

In some implementations, the satellites of the satellite platform may each exchange state information with one or more other satellites and the ground control system for the platform. This state information may include current operational state information for each of the applications, such as the tasks or processes that are operating, and may further exchange data generated at least partially from the sensors of the satellite. This data may be used in a peer group, wherein a first satellite may identify a first set of data, and provide the data to a second satellite. The second satellite may then identify second data and, process the first and second data as defined by the application. This operation may be used, as an example, in imaging operations, wherein a first satellite may take images of an object over a first period of time, and provide data for the images to the second satellite. The second satellite may take subsequent images and use the data for the first images and the subsequent images to make a determination about an object. Although this is one example, it should be understood that other operations may use peer sharing of state data to identify characteristics about measured data from the satellite sensors.

FIG. 1 illustrates a satellite environment 100 according to an implementation. Satellite environment 100 includes satellites 110-113, satellites 120-123, Earth 190, ground control system 170, and launch system 180. Satellites 110 and 120 belong to a first peer group 140, and satellites 111, 112, and 122 belong to second peer group 141, wherein the peer groups may be used to share state information, such as application state and data for the applications executing thereon. Satellites 110-113 and satellites 120-123 communicate via wireless communication links 130-132. Ground control system 170 communicates with satellites 110-113 and satellites 120-123 using wireless communication link 135.

As described herein, a plurality of satellites 110-113 and 120-123 may be launched and deployed as an orbiting platform for a plurality of different software applications. To generate the applications, design platform 175 is provided, which may include various tools and APIs that permit organizations to generate the software applications. In some implementations, design platform 175 may provide users with selectable functions and interface elements that are available on each of the satellites. Using the functions and available interface elements, the developer or developers for a particular organization may generate a software application that performs desired operations. For example, a developer may generate an application that uses a camera on a satellite to track movements of relevant objects.

Once the application is developed, the application may be provided to verification platform 176, which can be used to verify and test the application before deploying the application to the satellite platform. Verification platform 176 may comprise a physical or virtual testbed, wherein the application can be deployed to one or more test satellites to determine the functionality of the application. In some implementations, in addition to testing the functionality, verification platform may further apply tests to the application to ensure that the application is approved for operating on the physical platform. These tests may include, but are not limited to, ensuring the application is not malicious to other applications that may execute on the same satellite, ensuring the application does not change the flight structure or operations of the satellite, ensuring the data is properly communicated between other satellites and the ground control system, or any other similar tests to verify the operation of the application.

In addition to developing and verifying the application, availability platform 177 may be used as part of ground control system 170 to schedule the application in the orbiting cluster. This scheduling may be used to determine satellites that apply to the operations of an application, operation times on each of the satellites, processing, communication, and sensor resources of the application, or any other similar scheduling for the satellite platform. In at least one implementation, availability platform 177 may receive user input regarding deployment requirements for a software application, wherein the deployment requirements may comprise geographic areas on Earth of interest, operation times of interest, sensor requirements, processing requirements, security requirements, cost constraints, or any other similar deployment requirement, including combinations thereof. Additionally, availability platform 177 may identify availability information for resources in the satellite platform, and may determine deployment options for the deployment of a software application based on the deployment requirements and the availability information for the satellite platform. Once the deployment options are identified, they may be provided to the developer of the software application, wherein the developer may use the options to select a deployment of the application in the platform. In some implementations, the application may be implemented using the current satellites in orbit, however, it should be understood that the options provided to the developer may also provide options to add additional satellites to the platform to provide the desired operation.

Once a deployment option is selected via availability platform 177, ground control system 170 may initiate an uplink with one or more of the satellites to provide the application to the satellites, as well as update any scheduling information for the satellites. Once uploaded to the desired satellites, the application may begin execution based on the scheduling determined at availability platform 177. In some implementations, the uplink from ground control system 170 may be solely responsible for providing the applications to the required satellites. In other implementations, ground control system 170 may supply an application to a first set of satellites, which may then distribute the application to one or more other satellites of the satellite platform. For example, ground control system 170 may provide a first application to satellite 120, wherein satellite 120 may, in turn supply the application to other satellites in a peer group. In particular, satellite 120 may provide the application to satellite 110 that is in the same peer group, permitting satellite 110 to provide operations of the application without directly receiving the communication from ground control system 170. Additionally, similar to providing the initial configuration to the satellites, ground control system 170 may further be used to supply updates to each of the applications operating in the satellite platform, and may further update any scheduling information on each of the satellites.

Also illustrated in satellite environment 100 is launch system 180, which may be used to transport satellites (sats) 181 into orbit with orbiting satellites 110-113 and 120-123. Satellites 181 include a hardware and software configuration that permits applications to execute as virtual nodes on the satellites. In some implementations, satellites 181 may be launched using launch system 180 without applications, and instead may be provided with a base operating system or hypervisor that can be used to load and execute applications as they are provided in an uplink from ground control system 170. In other implementations, satellites 181 may be configured with a first set of applications capable of being executed via an operating system or hypervisor on the satellites. Thus, once into orbit, the applications may initiate execution to provide the operations of the applications. These applications may further be added to, removed, and modified based on information provided in the uplink from ground control system 170.

In some implementations, the launch of satellites 181 may be controlled, at least in part, on an application that is desired to be deployed in the satellite cluster. In particular, if currently deployed satellites are incapable of providing the operations of an application, the developer of the application may select to deploy additional satellites with required hardware to support the application. Once deployed, the application may be provided to the newly launched satellites for execution. Additionally, one or more applications may also be provided to the newly launched satellites to share the available resources provided by the new satellite.

Figure 2:
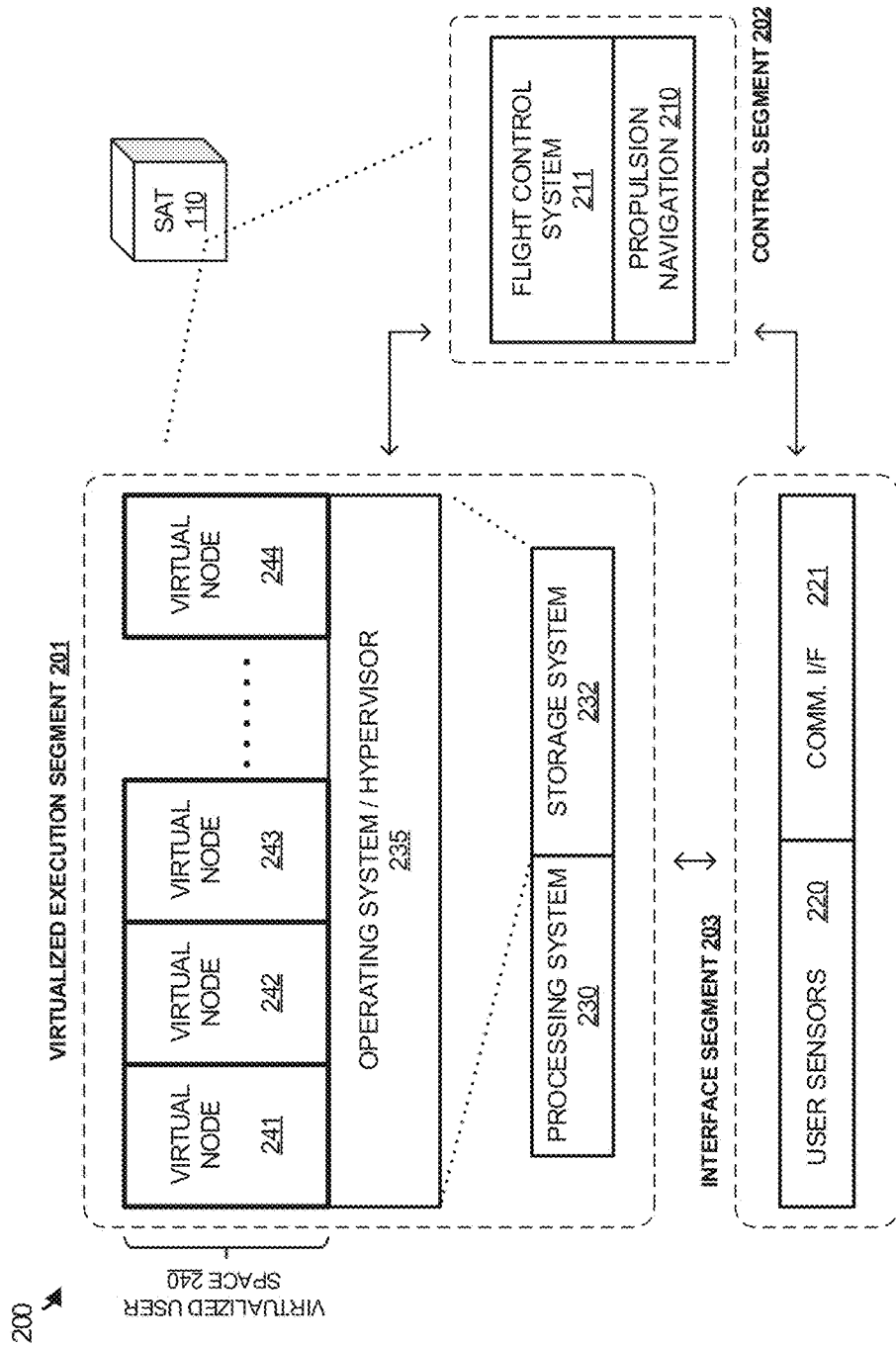
FIG. 2 illustrates an expanded view of a satellite capable of providing a platform for virtual nodes according to an implementation.

FIG. 2 illustrates an expanded view 200 of a satellite 110 capable of providing a platform for virtual nodes according to an implementation. Satellite 110 includes virtualized execution segment 201, control segment 202, and interface segment 203, which may be coupled using various communication links. Virtualized execution segment 201 is representative of a virtualized execution system, which includes a virtualized user space 240 for virtual nodes 241-244, an operating system or hypervisor 235, a storage system 232 to store the operating system and virtual user space, and a processing system 230. Control segment 202 further includes flight control system 211 and propulsion navigation 210. Interface segment 203 further includes user sensors 220 and communication interface 221, wherein communication interface 221 may be used for ground communication and inter-satellite communication. User sensors 220 may include imaging sensors, temperature sensors, light sensors, or some other similar sensor capable of interaction with virtual nodes 241-244.

As described herein, organizations may generate applications that are capable of being deployed as virtual nodes on one or more satellites of a satellite platform. These applications may be provided from a ground control system, or may be provided from another satellite via communication interface 221 on satellite 110. Once the applications are provided, operating system/hypervisor 235, which is stored on storage system 232 and executed by processing system 230 may provide a platform for the execution of the applications. Here, each application provided to satellite 110 is executed as a separate virtual node in virtual nodes 241-244, wherein the virtual nodes may comprise full operating system virtual machines or containers capable of sharing resources from the underlying operating system in storage system 232.

To manage the execution of the virtual nodes, operating system/hypervisor 235 may manage a schedule that is used to allocate processing resources of processing system 230 to each of the nodes, user sensors 220 to each of the nodes, and other similar resources on satellite 110. In particular, the schedule may be used to ensure that each application is scheduled to receive processing resources from processing system 230 during defined time periods, and receive access to user sensors 220 during defined time periods. In some implementations, one or more of the applications may execute during the same time period on satellite 110. These applications may use different sensors in user sensors 220, may time share the use of sensors in user sensors 220, or may use the same data from user sensors 220 in their operation. To allocate the sensors operating system 235 may be responsible for providing each operating virtual node with a communication link to the required user sensor, and deallocating or removing the communication link to the required sensor based on the scheduling. For example, an imaging device may be accessed by virtual node 241 during a first-time period, wherein virtual node 241 may access the sensor based on addressing information provided by operating system 235. Once the time period expires, operating system 235 may prevent virtual node 241 from accessing the sensor, in some examples, by removing the addressing access of the virtual node, and allocating access of the sensor to a second virtual node.

In addition to the virtual node operations provided in virtualized execution segment 201, satellite 110 further includes control segment 202. Control segment 202, which may be communicatively linked to virtualized execution segment 201 and interface segment 203, is responsible for logistical control elements of the satellite of satellite 110. The operations may include managing the deployment of solar panels on the satellite, managing the positioning of the satellite with regards to the Earth or the sun, or any other similar operation. In at least one example, flight control system 111 may monitor for requests from operating system 235, and determine whether the satellite is capable of accommodating the request from operating system 235. For example, virtual node 241 may generate a request to move a user sensor, which also requires movement using propulsion and navigation 210. In response to the request, flight control system 211 may determine that the movement cannot be made, and may prevent the movement of the satellite using propulsion and navigation 210. Further, in some implementations, flight control system 211, may provide a notification to operating system 235 and virtual node 241 indicating that the movement is not permitted.

Although illustrated as a separate system in the example of FIG. 2, it should be understood that in some examples, flight control system may be implemented and stored on processing system 230 and storage system 232. However, it should also be understood that flight control system may be stored on a separate storage system and use a different processing system than operating system 235 and its corresponding virtual nodes.

Figure 3:
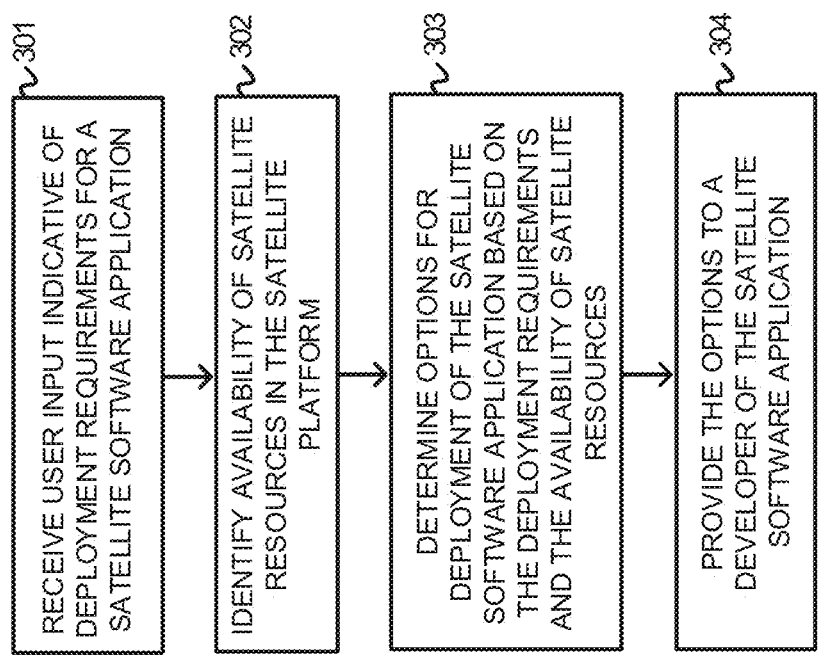
FIG. 3 illustrates an operation of a ground control system to provide deployment options for a software application according to an implementation.

FIG. 3 illustrates an operation of a ground control system to provide deployment options for a software application according to an implementation. The operations in FIG. 3 are referenced parenthetically in the paragraphs that follow with reference to systems and objects of satellite environment 100 of FIG. 1.

As depicted, availability platform 177 of ground control system 170 may receive (301) user input indicative of deployment requirements for a satellite software application to be deployed in the satellite platform. These deployment requirements may include geographic areas on Earth of interest, operation times of interest, sensor requirements, processing requirements, security requirements, cost constraints, or any other similar deployment requirement, including combinations thereof. In some implementations, the developer of the application may supply the requirements using natural language to provide information for the application. For example, the developer may provide, "obtain images of all ships in the North Pacific from June through August." In response to the input, availability platform 177, may use a natural language engine to identify the relevant deployment requirements, such as imaging of ships (type of sensor required), North Atlantic (geographic region), and June through August (time period of interest). In other implementations, rather than providing a natural language input, availability platform may provide dropdown menus, multiple choice selections, or some other similar express selection of the deployment requirements.

In addition to determining the deployment requirements, availability platform 177 of ground control system 170 may identify (302) availability of satellite resources in the satellite platform. This availability information may include the availability the availability of processing resources on the satellites of the satellite platform, the availability of sensors on the satellites of the satellite platform, the availability of communication interfaces, or any other similar information for the satellites currently orbiting for the satellite platform. In some examples, the availability may be based, at least in part, on applications that are already scheduled on the satellites. Thus, if a previously generated application required private use of an imaging sensor over a time period, then the sensor would be unavailable to any other applications during the time period.

Once the availability information and deployment requirements are identified, the operation further determines (303) options for deployment of the satellite software application based on the deployment requirements and the availability of satellite resources. For example, returning to the imaging example in the North Atlantic, options may be determined based on the availability of satellites over the particular geographic region, with the required sensors, during the required time period. In some examples, an option may permit one hundred percent or the complete operation to be provided for the application with satellites currently in the orbiting platform. In other implementations, only a portion, or a less than complete version, of the operations may be provided via the currently orbiting satellites. For example, if no satellites are in orbit over a geographic region during a particular time period, then images of the geographic region during the time period may not be possible using the currently deployed satellites. As a result, the options identified by ground control system 170 to implement the software application in the available satellites, or deploy one or more additional satellites to support a complete implementation of the desired application.

Once the options are determined for the software application, availability platform 177 on ground control system 170 provides (304) the options to a developer of the satellite software application. Once provided, via a user interface for the developer, the developer may then make a selection from the options to implement the application within the satellite platform. This may include, providing the software application using an uplink to one or more satellites and initiating execution of the application on the satellites to perform the desired operation.

In some examples, the software application may be developed prior to providing user input to availability platform 177, however, it should be understood that prior to developing an application, a user may check the availability of resources to support the desired operation. Once determining the availability, the user may develop the application to provide the required operations.

In some implementations, when a developer requires a new application be deployed, the developer may specify a budget requirement for the new application. As a result, when the options are determined for the developer, only options that fit within the budget of the developer may be provided. For example, if an application could be deployed with all of the deployment requirements fulfilled, but would cost over the developer's budget, the option may not be made available to the developer. Instead, the developer may be provided with other options, that could provide less than the complete deployment requirements, but fit within the budget of the developer.

In at least one example, in identifying the availability of satellite resources in the satellite platform, the ground control system may determine an orbit availability to support the application. In particular, because the satellite platform may not provide geosynchronous orbits, or may require multiple satellites to cover a particular geographic region or fixed point in space, the ground control system may be required to identify satellites that provide orbits for the desired points of interest. Once the orbit availability is identified, along with the available processing and sensor resources, options may be identified to support the deployment requirements. In some implementations, the satellites identified for a software application may handoff operations as the orbit takes them away from a location of interest. In other implementations, the satellites may exchange state information when two or more satellites are capable of covering a geographic region at any one time (cooperatively providing operations on a point of interest). In still other implementations, the satellites may be used to provide communications from a first geographic location to a second geographic location. Accordingly, the application may operate on satellites that service the first geographic location and the second geographic location, and may further operate on other satellites capable of forwarding communications between the two locations.

Figure 4:
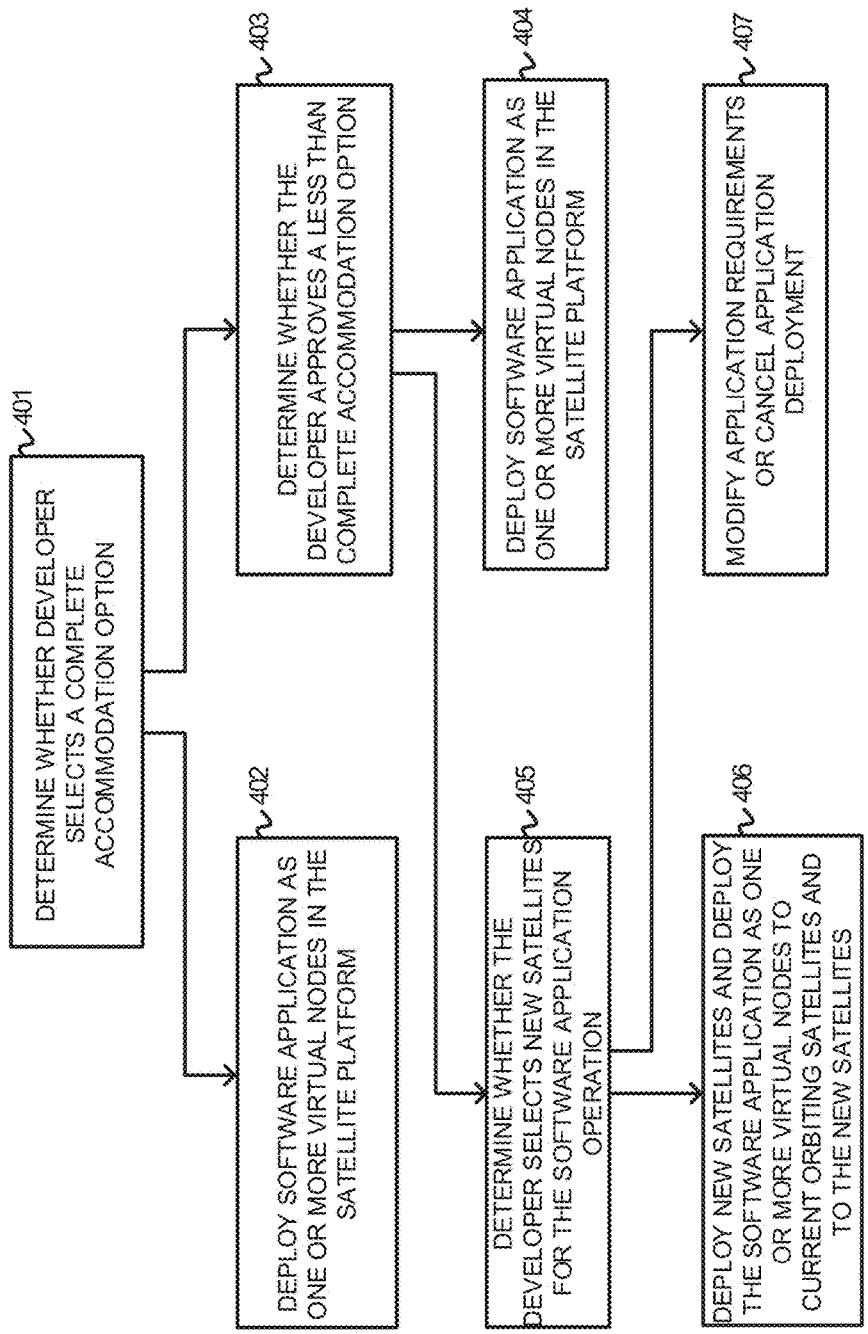
FIG. 4 illustrates an operation of a ground control system to provide deployment options for a software application according to an implementation.

Referring now to FIG. 4 illustrates an operation of a ground control system to provide deployment options for a software application according to an implementation. In particular, FIG. 4 is representative of operations of a ground control system once deployment options have been provided to a developer of an application. The operations in FIG. 4 are referenced parenthetically in the paragraphs that follow with reference to systems and objects of satellite environment 100 of FIG. 1.

As depicted, once the deployment options are provided to the developer of an application, ground control system 170 may determine (401) whether the developer selects a complete accommodation option, wherein the complete accommodation option indicates to the developer that all of the deployment requirements can be met by currently available satellites in the satellite platform. If the user has selected a complete accommodation option, then ground control system 170 may deploy (402) the software application as one or more virtual nodes in the satellite platform. This deployment may include providing via an uplink the software application to at least one satellite and, in some examples, distributing, via the satellites in orbit, the software application to any other required satellites.

In contrast, if the user does not select the complete accommodation option, either because the cost of implementing is too high or because there is currently no availability to support the complete deployment, ground control system 170 may determine (403) whether the developer approves a less than complete accommodation option. In particular, as described herein, availability information may be determined for processing and sensor resources of currently deployed satellites 110-113 and 120-123, wherein the availability may comprise time availability of the processing and sensor resources, as well as geographic coverage availability of each of the processing and geographic resources. Once determined, the availability information may be compared to the deployment requirements of the software application to determine whether the application can be accommodated by the currently deployed satellites 110-113 and 120-123. In some examples, either because the satellites are already in use by one or more other software applications during the requested times or the satellites do not cover the required geographic region required by the software application during the required time period, ground control system 170 may determine a percentage, ratio, or some other scoring value indicating the amount of the request that can be accommodated using currently deployed satellites. For example, if no current satellites covered the most northern part of the Pacific Ocean, but Satellites could cover the remaining portions of the ocean, then ground control system may indicate a percentage of the ocean that could be covered by the satellites to support an application targeting the entire ocean. In an alternative example, percentages that are less than one hundred percent coverage for a software application may provide a lower cost than other options with a higher percentage of accommodating the request. Accordingly, a developer may select a lower percentage of accommodation to accommodate a budget, although all of the deployment requirements for the application may not be supported by the satellite platform.

If an administrator approves a less than complete accommodation option, then ground control system 170 may deploy (404) the software application as one or more virtual nodes in the satellite platform. In contrast, if the administrator does not approve a less than complete accommodation option, then ground control system 170 may determine (405) whether the developer desires new satellites to support the software application. If the developer does desire new satellites, ground control system 170 may deploy (406) new satellites, such as satellites 181, and deploy the software application as one or more virtual nodes to current satellites in orbit and the additional new satellites requested by the developer. In some examples, the satellites that are deployed may be deployed as a defined form factor with defined sensor and processing configuration. In other examples, the developer of the software application may make modifications and select hardware (processing systems, sensors, and the like) to be deployed as the new satellite. In some implementations, the developer may initially deploy the software application to satellites that are currently in orbit, and further deploy the software application to new satellites as they are launched into orbit. In other implementations, the developer may delay the deployment of the application until the new satellites are placed into orbit, and deploy the application to the satellite platform once the new satellites are deployed.

In the alternative, if the developer does not select new satellites to provide the desired operation of the software application, ground control system 170 may permit the developer to modify (407) the application deployment requirements or cancel the application deployment to the satellite platform.

Figure 5:
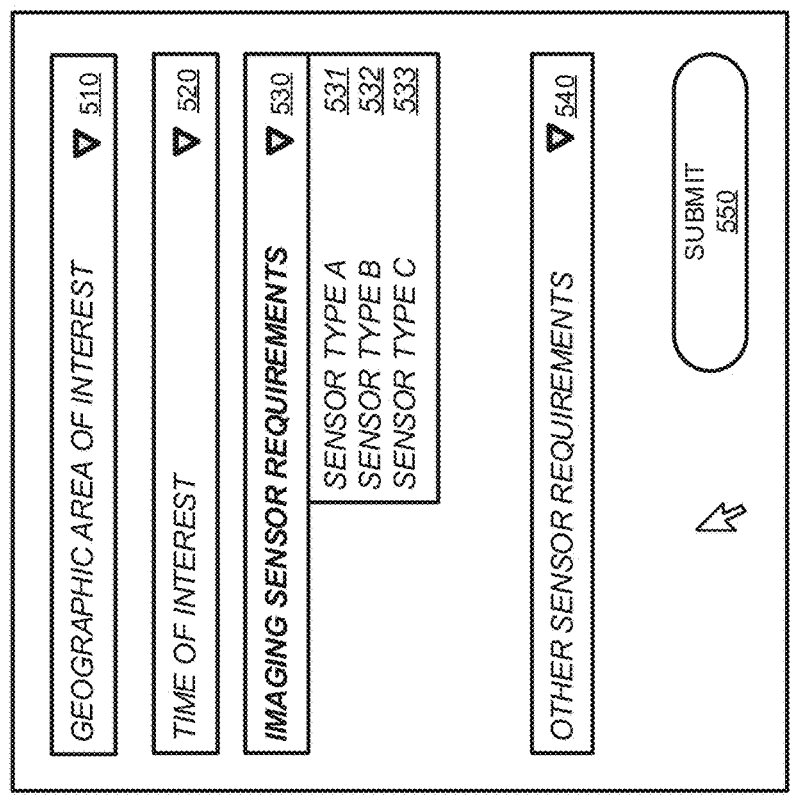
FIG. 5 illustrates a user interface to provide deployment requirements for a software application according to an implementation.

FIG. 5 illustrates a user interface 500 to provide deployment requirements for a software application according to an implementation. User interface 500 includes drop-down menus for geographic area of interest 510, time of interest 520, imaging sensor requirements 530, and other sensor requirements 540. Imaging sensor requirements 530 includes sensors 531-533, however, it should be understood that any number of sensors may be made available in the drop-down menu. Although illustrated in the present example with four drop-down menus, it should be understood that any number of drop-down menus might provide similar operations.

As described herein, to deploy an application to an orbiting satellite platform, a developer may be required to provide deployment requirements for the application. Here, the user is provided with various drop-down menus to select the various requirements for the application. Once the user selects the requirements, the user may determine the availability of satellite resources for a software application using submit function 550. After submitting the requirements, the ground control system may determine the availability of satellite resources in the satellite platform, and determine options to be provided to the user based on the deployment requirements and the satellite availability.

While demonstrated in the example of user interface as providing drop-down menus to select the requirements for a software application, it should be understood that other user interface elements may be provided to a developer to determine the availability of resources in a satellite environment. These user interface elements may include multiple choice selections, natural language input forms, or some other similar user input element. For example, the user may be provided with a text box permitting the user to input natural language requirements for the software application. Once provided, the ground control system may process the natural language input and abstract the deployment requirements for the application.

Although illustrated in the example of FIG. 5 as providing sensor requirements, it should be understood that the user may also provide processing system and/or communication interface requirements for a satellite. For example, an application may be used to provide communications from a first geographical location to a second geographical location using one or more satellites to forward the communication between the two locations.

Figure 6:
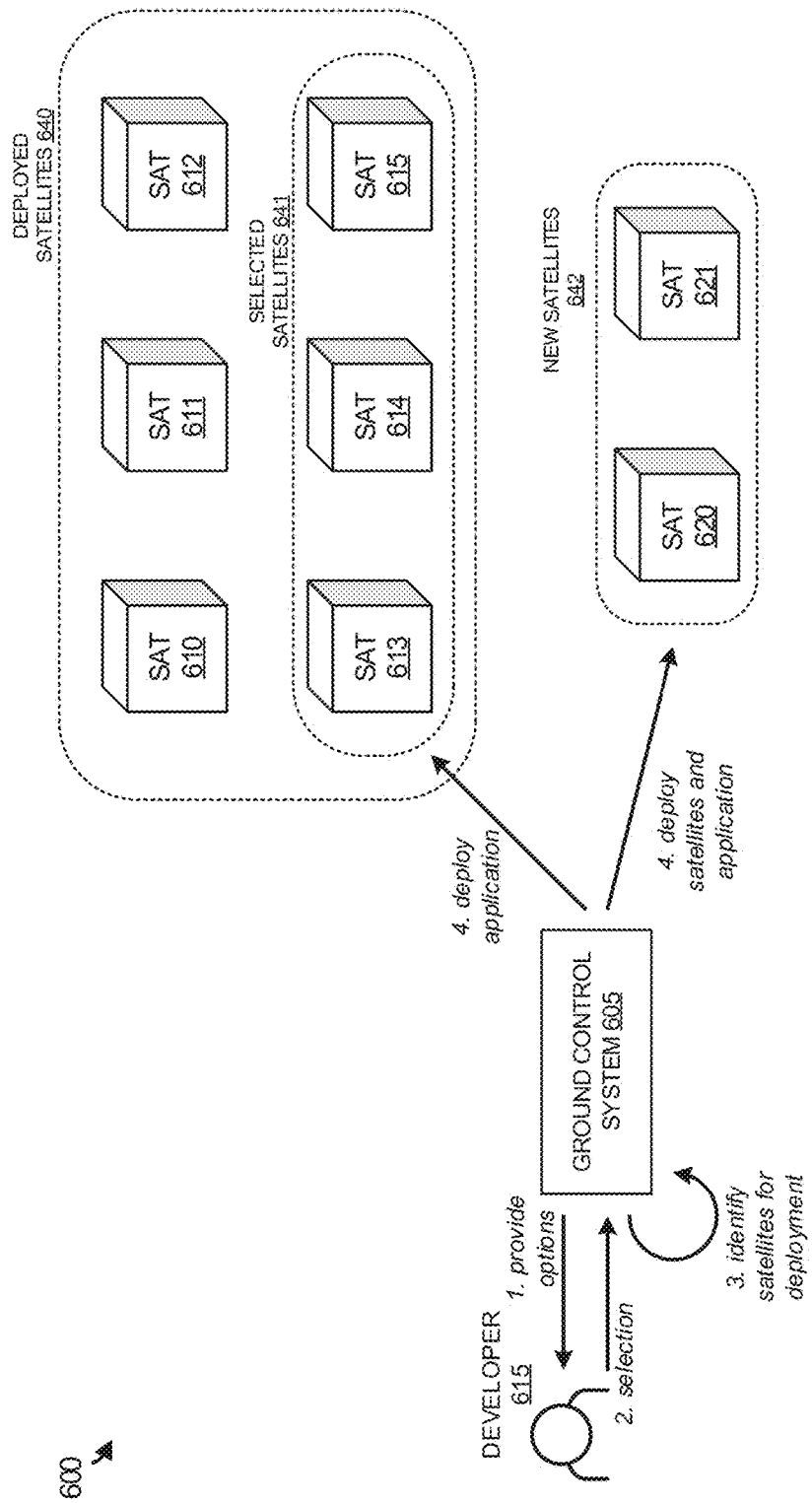
FIG. 6 illustrates a deployment of a software application according to an implementation.

FIG. 6 illustrates a deployment 600 of a software application according to an implementation. Deployment 600 includes ground control system 605, developer 615, deployed satellites 640 with selected satellites 641, and new satellites 642. Deployed satellites 640 includes satellites 610-615 and are representative of satellites available in orbit at the time of the request by the developer. New satellites 642 include satellites 620-621 and are representative of satellites that can be put into orbit at a future time after the request from a developer. Although illustrated with three satellites in selected satellites 641, it should be understood that any number of current satellites may be selected to provide the operations of the software application.

In the example of deployment 600, ground control system 605 provides, via a user interface at step 1, one or more options for a developer 615 to deploy a software application in a satellite platform. These options may include an option that can completely service the deployment requirements of the developer using currently deployed satellites, at least one option that can provide a portion of the deployment requirements using the currently deployed satellites, an option that can completely service the deployment requirements of the developer using currently deployed satellites and newly deployed satellites, or some other similar option. Once supplied, developer 615 may select, at step 2, an option that requests a combination of currently deploy satellites 640 and new satellites 642. After receiving the selection from developer 615, ground control system 605 may, at step 3, identify satellites for deployment of the software application, wherein the satellites include currently deployed satellites that can, at least partially, service the operations of the application, as well as new satellites to provide the remaining portion of the operations. Once identified, the application may be deployed as virtual nodes, at step 4, from ground control system 605 to selected satellites 641, while new satellites 642 are created and deployed into orbit and to provide a platform for the required application.

In some implementations, in identifying new satellites 642, the satellites may comprise a defined form factor with a processing system and sensors for the application. In other implementations, developer 615 may define the processing system and/or sensors that are required for the new satellites. In particular, the developer may define any imaging sensors, temperature sensors, processing system, or any other similar processing system or sensor attribute. Once defined, the satellite may be generated, and launched into orbit to provide the desired operations. In some examples, in deploying the application, the application may hold deployment until all of the new satellites are launched into orbit, however, it should be understood that the application may provide initial operations using satellites 613-615 prior to the launch of satellites 620-621 in some examples.

Figure 7:
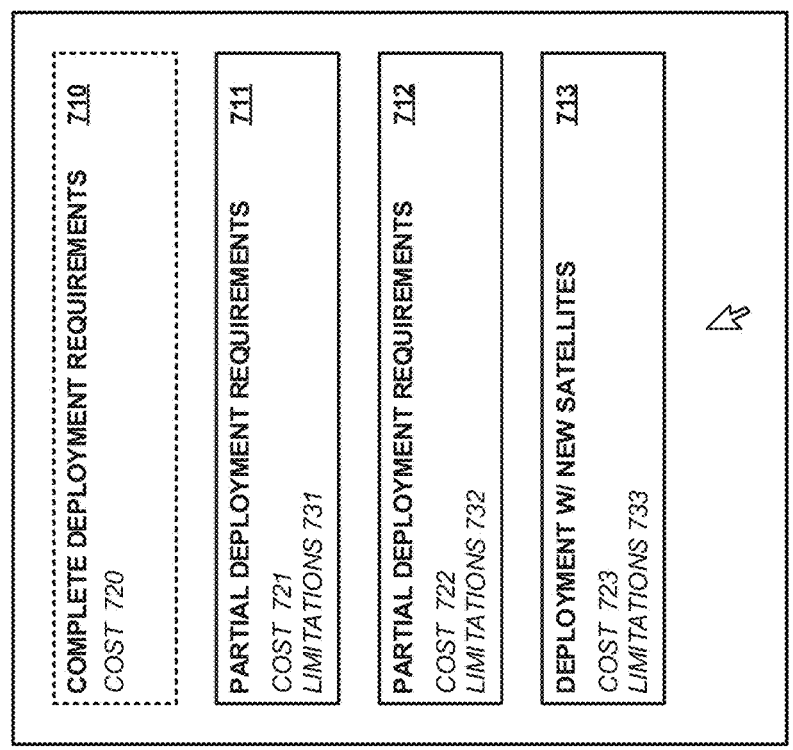
FIG. 7 illustrates an option user interface according to an implementation.

FIG. 7 illustrates an option user interface 700 according to an implementation. Option user interface includes selectable options for complete deployment requirements 710, partial deployment requirements 711-712, and complete deployment via new satellites 713. Although four options are provided in the present example, it should be understood that more or fewer options may be provided. For example, if complete deployment were impossible using satellites that would be deployed at the time of the application deployment, then the complete deployment requirements 710 option may not be provided to the developer.

Here, once a developer of an application provides deployment requirements for the software application, the ground control system may provide the developer with options for deploying the application in the satellite platform. In particular, the ground control system may identify availability attributes for resources on satellites during the time periods required for the application. Once identified, the ground control system may determine options for the user based on the availability information and the deployment requirements of the application, and provide the options to the developer via a user interface.

Here, four options are identified for the developer. A first option, complete deployment requirements 710, permits the software application to be deployed in the platform while providing all of the deployment requirements and is associated with a first cost 720. The second two options, partial deployment requirements 711-712 permit the software application to be deployed in the platform while providing a portion of the deployment requirements and are associated with costs 721-722 and limitations 731-732. In some examples, costs 721-722 may comprise lower costs than cost 720, and may provide adequate operations for the developer while maintaining a budget for the developer. In the present instance, in addition to costs 721-722, options 711 and 712 further include limitations 731-732, which represent the limitations or the portions of the deployment requirements specified by the developer that cannot be achieved using the deployment option. For example, if a developer would like to track trucks over the European continent during the summer months, a limitation might include a time limitation where the application could not provide the full operation during a particular time period, a location limitation where one or more geographic locations could not be monitored, or some other similar limitation, including combinations thereof.

The last option in the example of user interface 700 is deployment with new satellites 713, which includes costs 723 and, if any, limitations 733. Here, rather than relying on the satellites that are currently available for the software application, a developer may select to introduce a new satellite to the platform to provide adequate operations of the software application. Thus, in addition to, or in some examples in place of the current satellite deployment, the developer may select to launch a new satellite for the software application. This satellite may comprise a predefined structure in some examples, such as processors, sensors, and the like, or may comprise components selected by the developer and target toward the application. However, cost 723 associated with option 713 may be more than options 710-712, and thus may be undesirable for developers with a particular budget. In some examples, the deployment with new satellites may comprise temporarily providing the application to currently deployed satellites, then, when the new satellites are in orbit, adding the operations of the application to the newly deployed satellites.

Although illustrated with a cost and limitations in the present example, it should be understood that other information may be provided in addition to, or in place of, the cost and limitation information. For example, the ground control system may generate an accommodation score for each of the options and provide the accommodation score with the option to assist the user in making a selection for the application.

Figure 8:
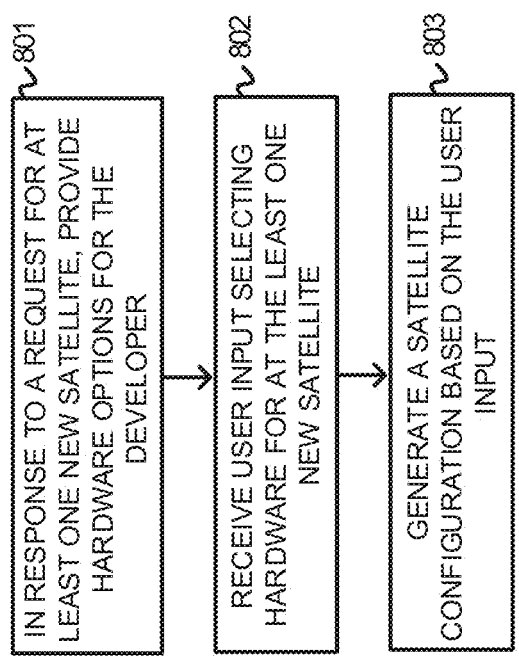
FIG. 8 illustrates an operation of a ground control system to design a new satellite according to an implementation.

FIG. 8 illustrates an operation of a ground control system to design a new satellite according to an implementation. The operations of FIG. 8 may be provided via ground control system 170 or some other similar ground control system.

As described herein, when a user is provided with options for implementing a software application in a satellite platform, the currently available satellites of the platform may be incapable of providing the desired operation. Consequently, the user may select an option to generate at least one new satellite to provide the desired operations. For example, if the current satellites did not cover a desired geographical area, then a new satellite may be deployed to provide coverage of the geographical area.

Here, when the user requests at least one new satellite, the ground control system provides (801) hardware options for the developer to be implemented in the at least one new satellite. In some examples, the hardware options are determined based on the deployment requirements that are provided for the user. For example, if the developer required specific imaging sensors, then the hardware that is provided to the developer may include the required sensors. In other implementations, such as when the user provides the type of items to be monitored using the satellite (trucks, ships, weather, etc.), the ground control system may determine the types of sensors that can be used for the monitoring, and suggests the sensors to the developer. Accordingly, based on the size, coverage area, and other similar requirements for the application, the ground control system may be used to match the desired objective of the application to the appropriate new sensor.

Once the options are made available to the developer, the operation further receives (802) user input selecting hardware for the at least one new satellite. In some examples, to receive the input, the user may be provided with drop-down menus, multiple choice selections, or some other similar selection mechanism, wherein the user can select various sensors, processing system options, or any other similar option. After selecting the hardware, the ground control system may then generate (803) a satellite configuration based on the user input. In some examples, the satellite generated with the new hardware must meet size and shape constraints. Consequently, the ground control system may be required to determine positioning and layout information for the hardware to ensure that the hardware selected by the developer is capable being implemented within the required constraints.

In at least one implementation, as the developer makes selections for the hardware required for the satellite a cost estimate may be provided to the developer. For example, if the developer selected one imaging sensor over another, the cost may be modified to reflect the selected sensor. Additionally, in some implementations, during the selection of the hardware for the satellite, an indication may be made indicating if a larger satellite platform or rocket is required to deploy the provided hardware. Again, if the developer selected a first imaging sensor over a second imaging sensor, the ground control system may indicate that a larger satellite is required to support the first imaging sensor over the second imaging sensor.

Figure 9:
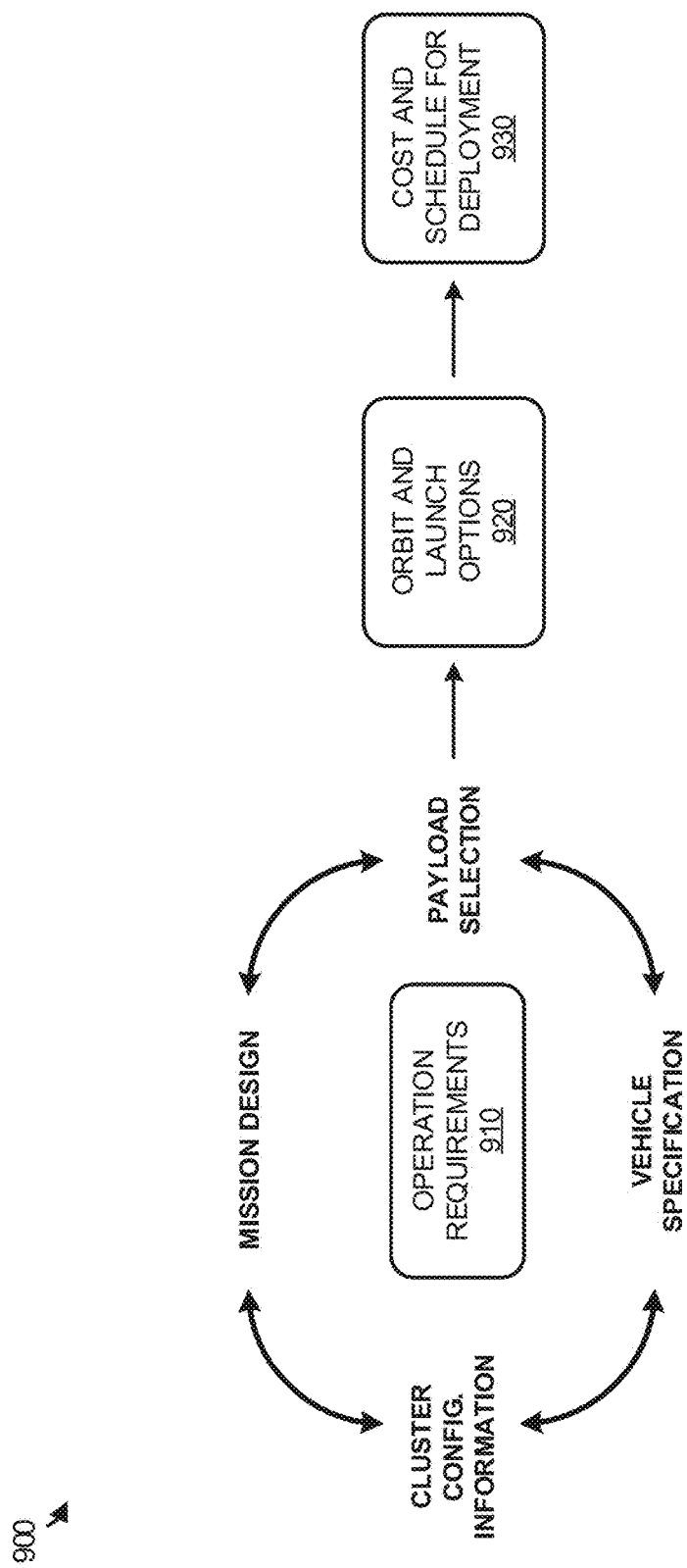
FIG. 9 illustrates an overview of managing deployments of software applications according to an implementation.

FIG. 9 illustrates an overview 900 of managing deployments of software applications according to an implementation. Overview 900 includes operation requirements 910, orbit and launch options 920, and cost and scheduling for deployment 930.

As depicted, to deploy an application in a satellite platform, the developer of an application may be required to provide operation requirement 910, wherein the requirements may include mission design (the operations desired to be performed by the application), payload selection (selecting a particular application to deployed for developer), vehicle specification (selecting the hardware of the satellite), or cluster configuration options (identifying state exchange traits and/or geographic requirements for the application), or some combination thereof. Once the traits are determined, orbit and launch options 920 may be provided to the developer, wherein the launch options may include options for currently orbiting satellites, and may further include options that provide for the addition of one or more new satellites to the platform. After providing the options, cost and schedule for deployment operation 930, may receive a selection of an option, allocate cost to the option, and schedule the deployment of the application.

Although illustrated as separate in the present implementation, it should be understood that cost may be calculated at the time of the orbit and launch options. Accordingly, the developer may be able to select a particular option based on the cost associated with the particular option.

Figure 10:
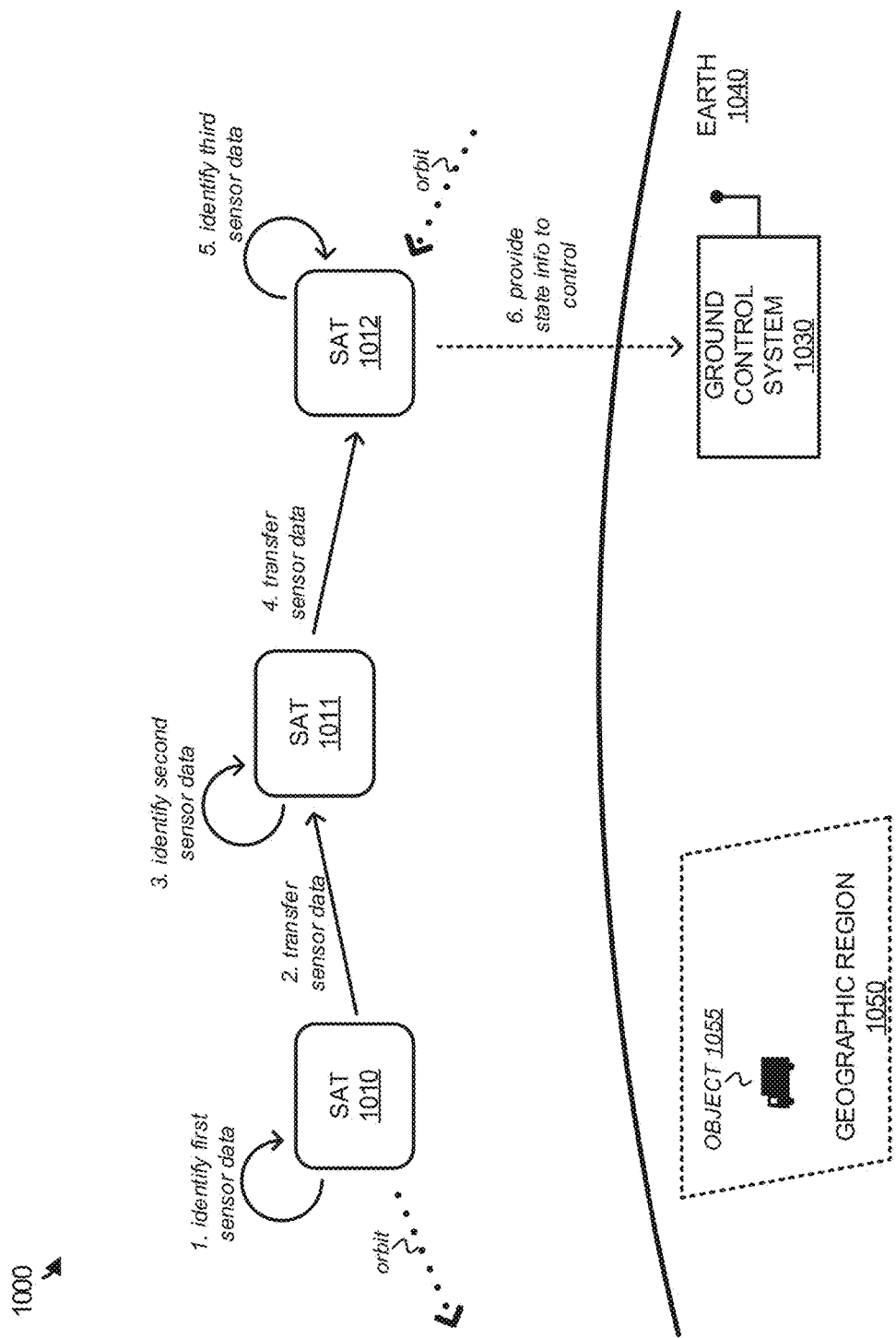
FIG. 10 illustrates a deployment of an application according to an implementation.

FIG. 10 illustrates a deployment 1000 of an application according to an implementation. Deployment 1000 includes satellites 1010-1012, ground control system 1030, and Earth 1040 with geographic region 1050. Although three satellites are included in the present example, it should be understood that any number of satellites may be deployed as the satellite platform.

As described herein, when scheduling an application to be deployed to a satellite platform, the developer of the application may be required to provide deployment requirements for the application. These deployment requirements may include mission design, payload selection or application selection, cluster configuration (state communication required between satellites), vehicle specification, or some other similar deployment requirement information for the application. In at least one example, the developer may desire an application that covers geographic area of interest and identifies specific objects within the geographic area of interest. In the present implementation, deployment 1000 deploys an application to the satellite platform to identify trucks within geographic region 1050. To select the satellites for the deployment, the developer may supply requirements indicating geographic region and objects that are to be monitored within the region. In response to the input, ground control system 1030 may identify availability of satellites of the platform to support requirements, wherein the availability may include sensor and processing system availability, and may also include geographic region and orbit availability. In particular, because satellites of the satellite platform may not operate in a geosynchronous orbit, the satellites may be required to exchange state information, as one satellite is incapable of providing continuous operations on a geographic region. Accordingly, based on the user input, ground control system 1030 may identify processing and sensor availability for satellites whose orbit covers the geographic region, and determine a scheduling options based on the availability information. Once an option is selected, the application may be supplied to the satellites associated with the selection, wherein the application may operate as a virtual node alongside other applications on the same satellite.

Here, satellites 1010-1012 are in orbit around earth 1040, wherein satellite 1010 identifies first sensor data, at step 1, related to geographic region 1050. Once the data is identified, and the orbit takes satellite 1010 out of sensor range for geographic region 1050, satellite 1010 will transfer, at step 2, sensor data to satellite 1011. For example, if object 1055 were identified using sensor data for satellite 1010, satellite 1010 may provide global positioning information for object 1055, such that satellite 1011 could maintain the monitoring the object. Once received, satellite 1011 identifies, at step 3, second sensor data related to geographic region 1050, and transfers, at step 4, sensor data to satellite 1012 when the orbit for satellite 1011 takes satellite 1011 away from geographic region 1011. Again, this sensor data may include location information for object 1055, velocity or speed information for object 1055, or any other similar information related to object 1055. Further, satellite 1011 may identify any additional objects within geographic region 1050.

Once received at satellite 1012, satellite 1012 may, at step 5, identify any additional sensor data related to the geographic region and, in the present example, provide state data (which includes processed and/or unprocessed sensor data) to ground control system 1030. Although illustrated in the present example as satellite 1012 providing sensor data to ground control system 1030, it should be understood that any combination of satellites 1010-1012 can provide sensor data to the ground control system. Additionally, despite being illustrated in the present example as each satellite identifying sensor data, it should be understood that at least one satellite may be incapable of providing operations for an application due to processing or sensor availability for the application. As a result, in some examples, a satellite may be used exclusively for an application to exchange state information between two other satellites.

While illustrated in the present example as handing off sensor operations between satellites to provide a desired operation of an application across multiple satellites, it should be understood that the scheduling of an application across multiple satellites may be used to provide additional operations. For example, an application may be deployed to multiple satellites to provide communications from one geographical location on earth to a second geographical location on earth. This may permit a party in the first geographical location to quickly communicate with the party in the second geographical location. In another example, rather than using a single satellite for a geographic region, multiple satellites may cooperate to provide operations with respect to a region. Referring to the example of FIG. 10, if satellites 1010-1011 were over geographic region 1050 at the same time, the satellites may exchange data about the geographic region. For instance, if satellite 1010 identified an object, satellite 1010 may provide geographic positioning information to satellite 1011, such that satellite 1011 may provide operations with the same object. In still other implementations, although illustrated in the example of FIG. 10 as using a geographical region on Earth, it should be understood that satellites may be used to provide radio astronomy. In particular, satellites may be configured use its radio receiver assets or sensors to collect at appropriate times specific radio signals from fixed targets in space. Thus, instead of using a single satellite, satellites may handoff operations during their orbit to detect information from an inertial target in space.

In some implementations, the applications on the satellites may use various exchange triggers to transfer state information to other satellites. These triggers, for an individual satellite, may be based on global positioning coordinates identified by applications on the satellite, the orbit of the satellite, the current time identified by the satellite, a command in the application, signal detection or beacon detection in the satellite, network traffic deltas (latency, dropped packets, and the like), processing system utilization on the satellite, node failure, the addition of a new node, telemetry values, or some other similar trigger value. Referring to the example of deployment 1000, the state information communicated between satellites 1010-1012 may occur based on the orbit of the satellites, based on a measured time of the satellite, based on the identification and monitoring of object 1055 in geographic region 1050, or some other similar trigger based on the monitoring of geographic region 1050.

Figure 11:
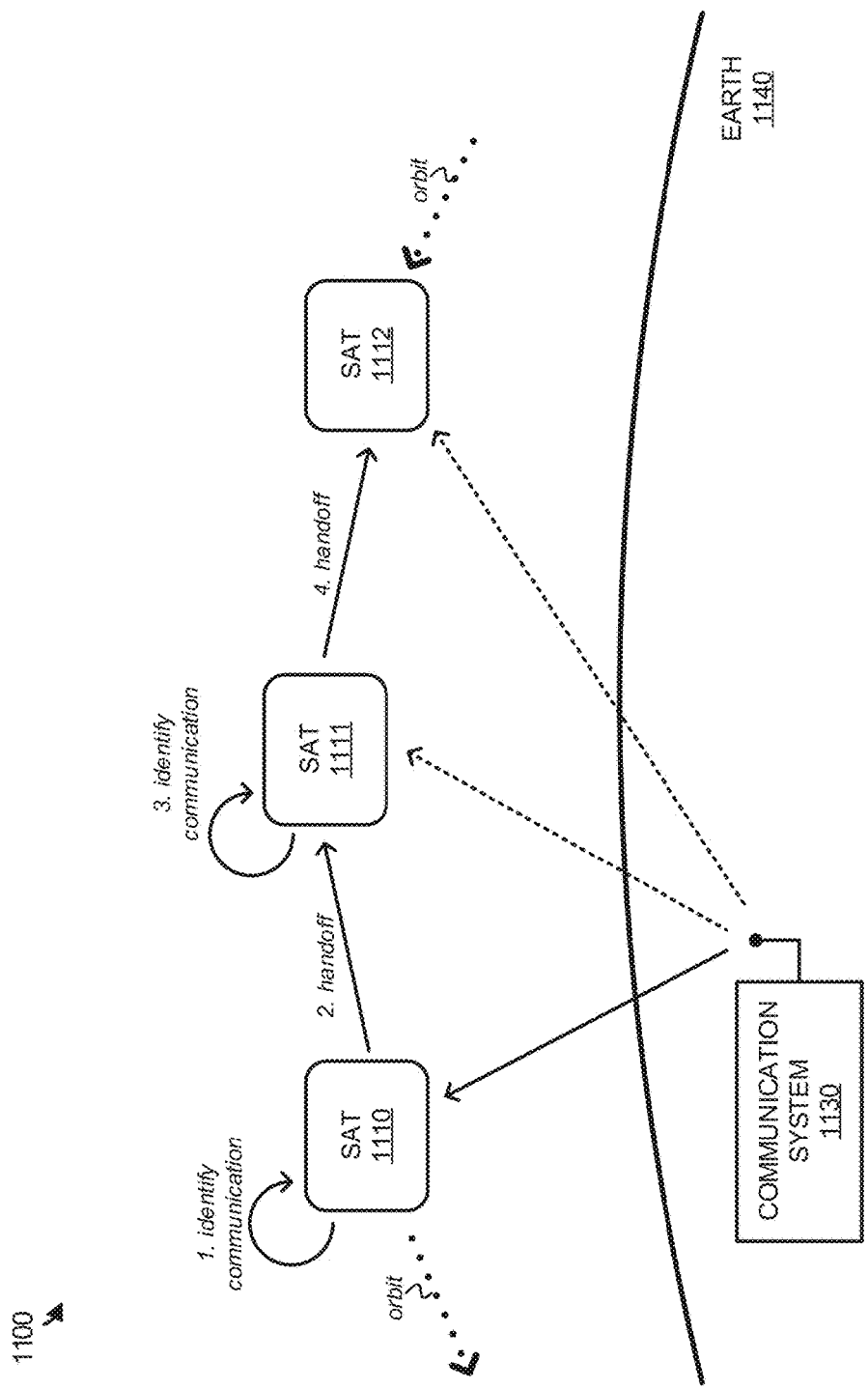
FIG. 11 illustrates a deployment of an application according to an implementation.

FIG. 11 illustrates a deployment 1100 of an application according to an implementation. Deployment 1100 includes satellites 1110-1112, communication system 1130, and Earth 1140. Although three satellites are included in the present example, it should be understood that any number of satellites may be deployed as the satellite platform. Deployment 1100 is an example of a communication application which may be used to provide communications between geographical locations on Earth 1140.

As depicted, satellite 1110 is configured to identify communications to communication system 1130, wherein, in response to a communication, satellite 1110 may forward the communication to one or more other satellites and/or a second destination communication system for the communication. For example, a communication may be initiated in Africa and transmitted to satellite 1110 to be transferred to a destination communication system in Europe. As satellite 1110 continues to orbit, satellite 1110 may handoff, at step 2, the operations of the application to satellite 1111, wherein the handoff may be based on a lack of signal from communication system 1130, based on the orbit location of satellite 1110, based on latency of the data packets from communication system 1130, or based on any other similar handoff trigger. Once handed off, satellite 1111 may execute the application to identify, at step 3, communications from communication system 1130 and forward the communication to at least one destination communication system. Additionally, similar to satellite 1110, once a handoff trigger is detected, satellite 1111 may handoff, at step 4, the operations of the application to satellite 1112 to provide communication support for communication system 1130.

Although illustrated in the example of deployment 1100 as receiving communications from communication system 1130, it should be understood that the application may also be to forward communications to communication system 1130. In particular, the active satellite for the application may receive a communication from a second satellite or a second communication system on Earth 1140, and forward the communication to communication system 1130.

Figure 12:
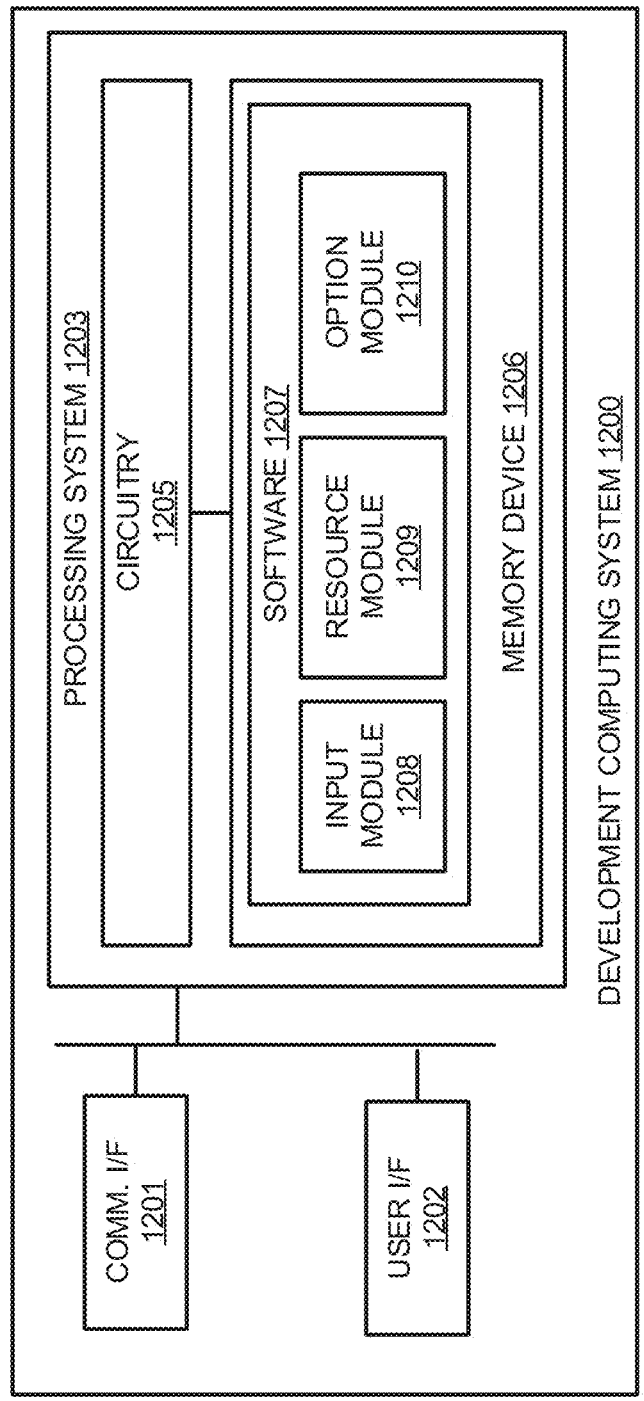
FIG. 12 illustrates a development computing system according to an implementation.

FIG. 12 illustrates a development computing system 1200 according to an implementation. Computing system 1200 is representative of any computing system or systems with which the various operational architectures, processes, scenarios, and sequences disclosed herein for a ground control system can be implemented. Computing system 1200 is an example of a ground control system from FIG. 1 and FIG. 6, although other examples may exist. Computing system 1200 comprises communication interface 1201, user interface 1202, and processing system 1203. Processing system 1203 is linked to communication interface 1201 and user interface 1202. Processing system 1203 includes processing circuitry 1205 and memory device 1206 that stores operating software 1207. Computing system 1200 may include other well-known components such as a battery, power supply, and enclosure that are not shown for clarity. Computing system 1200 may represent one or more server computing systems, desktop computing systems, laptop computing systems, tablets, or some other computing system, including combinations thereof.

Communication interface 1201 comprises components that communicate over communication links, such as network cards, ports, radio frequency (RF), processing circuitry and software, or some other communication devices. Communication interface 1201 may be configured to communicate over metallic, wireless, or optical links. Communication interface 1201 may be configured to use Time Division Multiplex (TDM), Internet Protocol (IP), Ethernet, optical networking, wireless protocols, communication signaling, or some other communication format—including combinations thereof. In some implementations, communication interface 1201 may be configured to communicate with satellites of a satellite platform to provide applications, updates, and other configuration information, and may further be configured to receive, from the satellites, state information related to the state of processes for each of the applications and data for each of the applications.

User interface 1202 comprises components that interact with a user to receive user inputs and to present media and/or information. User interface 1202 may include a speaker, microphone, buttons, lights, display screen, touch screen, touch pad, scroll wheel, communication port, or some other user input/output apparatus—including combinations thereof. User interface 1202 may be omitted in some examples. In some implementations, user interface 1202 may be used to provide deployment availability information for a new software application, and may further be used to receive developer selections for deploying the new software application in the satellite platform.

Processing circuitry 1205 comprises microprocessor and other circuitry that retrieves and executes operating software 1207 from memory device 1206. Memory device 1206 may include volatile and nonvolatile, removable and non-removable media implemented in any method or technology for storage of information, such as computer readable instructions, data structures, program modules, or other data. Memory device 1206 may be implemented as a single storage device, but may also be implemented across multiple storage devices or sub-systems. Memory device 1206 may comprise additional elements, such as a controller to read operating software 1207. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 1205 is typically mounted on a circuit board that may also hold memory device 1206 and portions of communication interface 1201 and user interface 1202. Operating software 1207 comprises computer programs, firmware, or some other form of machine-readable program instructions. Operating software 1207 includes input module 1208, resource module 1209, and option module 1210, although any number of software modules may provide the same operation. Operating software 1207 may further include an operating system, utilities, drivers, network interfaces, applications, or some other type of software. When executed by processing circuitry 1205, operating software 1207 directs processing system 1203 to operate computing system 1200 as described herein.

In at least one implementation, input module 1208 directs processing system 1203 to receive user input indicative of deployment requirements for a software application. This input may be provided via drop-down menus, multiple choice selection, natural language input or some other similar input method via user interface 1202. In addition to identifying the deployment requirements, resource module 1209 directs processing system 1203 to identify an availability of resources in the plurality of satellites. These resources may include processing resources, communication resources, and sensor resources available on each of the satellites, and may be determined based on the current scheduling assigned to each of the satellites, as well load reports, which may be provided via state information from the satellites. Once the deployment requirements and the availability of resources are determined, option module 1210 may direct processing system 1203 to determine deployment options for deployment of the software application based on the deployment requirements and the availability of resources in the plurality of satellites, and provide the deployment options to a developer of the software application.

In some examples, the operations to determine deployment options may include determining whether each deployment requirement of the deployment requirements can be satisfied via the plurality of satellites. If each deployment requirement can be satisfied, then an option will be provided that indicates that the software application can be deployed with each deployment requirement satisfied. Additionally, if at least a portion of the deployment requirements can be satisfied, at least one option can be provided that indicates the software application can be deployed with limitations and may provide information about the particular limitations. For example, if the application can be deployed, but only cover a portion of the desired geographic region, then an option may be provided that indicates the limitation for the geographic region.

In some examples, in addition to providing options based on available satellites of the platform, option module 1210 may further provide options that permit the developer to add new satellites to the platform. Accordingly, to overcome any current deficiencies in the platform, the developer may select to deploy a new satellite, and in some examples the hardware for the new satellite, and deploy the new satellite for the application. Thus, in some implementations, an application may rely on currently available satellites, as well as new satellites to provide the operations of the application.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of providing software application deployments to an orbital satellite platform, the method comprising:
   receiving user input indicative of deployment requirements for hosting a software application by the orbital satellite platform, wherein the orbital satellite platform includes a plurality of in orbit satellites;
   identifying an availability of resources present in the plurality of in orbit satellites to support deployment of the software application;
   determining deployment options for deployment of the software application based at least on the deployment requirements and the availability of resources present in the plurality of in orbit satellites; and
   providing the deployment options via a user interface for user-initiated deployment of the software application onto one or more of the plurality of in orbit satellites.

2. The method of claim 1 wherein the deployment requirements comprise at least geographic areas of interest, operation times of interest, and sensor requirements.

3. The method of claim 1, wherein identifying the availability of resources present in the plurality of in orbit satellites comprises identifying a presence of at least virtualized execution resources and sensor resources across the plurality of in orbit satellites.

4. The method of claim 1, wherein providing the deployment options comprises providing at least a first deployment option for deploying the software application to the plurality of in orbit satellites, and a second deployment option for deploying the software application to at least one further satellite not yet deployed into the orbital satellite platform in addition to at least, one of the plurality of in orbit satellites.

5. The method of claim 4, further comprising:
   in the user interface, receiving a user selection of the first deployment option; and in response to the user selection, deploying the software application to one or more satellites in the plurality of in orbit satellites, wherein the software application executes as a virtual node on virtualized execution systems of the one or more satellites.

6. The method of claim 4 further comprising:
   in the user interface, receiving a user selection of the second deployment option; and
   in response to the user selection, identifying a configuration for the at least one further satellite not yet deployed into the orbital satellite platform.

7. The method of claim 6 wherein identifying the configuration for the at least one further satellite comprises receiving second user input indicative of hardware requirements for the at least further satellite.

8. The method of claim 1, wherein determining the deployment options for deployment of the software application based on the deployment requirements and the availability of resources comprises:
   determining whether each deployment requirement of the deployment requirements can be accommodated by the plurality of in orbit satellites based on the availability of resources present in the plurality of in orbit satellites;
   based at least on each deployment requirement being able to be accommodated, identifying in the user interface a deployment option indicating that the deployment requirements can be accommodated via the plurality of in orbit satellites;
   in the user interface, receiving a user selection of the first deployment option; and
   in response to the user selection, deploying the software application to one or more satellites in the plurality of in orbit satellites, wherein the software application executes as a virtual node on virtualized execution systems of the one or more satellites.

9. A computer apparatus comprising:
   one or computer readable storage media;
   a processing system operatively couple with the one or more computer readable storage media; and
   program instructions stored on the one or more computer readable storage media to manage software application deployments to an orbital satellite platform that, when read and executed by the processing system, direct the processing system to at least:
   receive user input indicative of deployment requirements for hosting a software application by the orbital satellite platform, wherein the orbital satellite platform includes a plurality of in orbit satellites;
   identify an availability of resources present in a plurality of in orbit satellites of the orbital satellite platform to support, deployment of the software application;
   determine deployment options for deployment of the software application based at least on the deployment requirements and the availability of resources present in the plurality of in orbit satellites; and
   provide the deployment options via a user interface for user-initiated deployment of the software application onto one or more of the plurality of in orbit satellites.

10. The computer apparatus of claim 9 wherein the deployment requirements comprise at least geographic areas of interest, operation times of interest, and sensor requirements.

11. The computer apparatus of claim 9, wherein the program instructions to identify the availability of resources present in the plurality of in orbit satellites direct the processing system to identify an availability of at least virtualized execution resources and sensor resources present across the plurality of in orbit satellites.

12. The computer apparatus of claim 9, wherein the program instructions to provide the deployment options direct the processing system to provide at least a first deployment option for deploying the software application to the plurality of in orbit satellites, and a second deployment option for deploying the software application to at least one further satellite not yet deployed into the orbital satellite platform in addition to at least one of the plurality of in orbit satellites.

13. The computer apparatus of claim 12, wherein the program instructions further direct the processing system to:
receive a user selection of the first deployment option; and
in response to the user selection, deploying the software application to one or more satellites in the plurality of in orbit satellites, wherein the software application executes as a virtual node on virtualized execution systems of the one or more satellites.

14. The computer apparatus of claim 12 wherein the program instructions further direct the processing system to:
receive a user selection of the second deployment option; and
in response to the user selection, identify a configuration for the at least one further satellite not yet deployed into the orbital satellite platform.

15. The computer apparatus of claim 14 wherein the program instructions to identify the configuration for the at least one further satellite direct the processing system to identify second user input indicative of hardware requirements for the at least one further satellite.

16. The computer apparatus of claim 9, wherein the program instructions to determine the deployment options for deployment of the software application based on the deployment requirements and the availability of resources direct the processing system to:
determine whether each deployment requirement of the deployment requirements can be accommodated by the plurality of in orbit satellites based on the availability of resources in the plurality of in orbit satellites;
based at least on each deployment requirement being able to be accommodated, presenting in the user interface a first deployment option indicating that the deployment requirements can be accommodated via the plurality of in orbit satellites;
receive a user selection of the first deployment option; and
in response to the user selection, deploy the software application to one or more satellites in the plurality of in orbit satellites, wherein the software application executes as a virtual node on virtualized execution systems of the one or more satellites.

17. The computer apparatus of claim 9 wherein the program instructions further direct the processing system to:
identify a budget requirement received via the user interface for the software application; and
determine the deployment options for deployment of the software application based at least on the deployment requirements and the availability of resources in the plurality of in orbit satellites direct the processing system to determine the deployment options for deployment of the software application based on the budget requirement, deployment requirements, and the availability of resources in the plurality of in orbit satellites.

18. An apparatus comprising:
one or computer readable storage media; and
program instructions stored on the one or more computer readable storage media to manage software application deployments to an orbital satellite platform that, when read and executed by a processing system, direct the processing system to at least:
receive user input indicative of deployment requirements for a software application to be deployed onto the orbital satellite platform comprising a plurality of in orbit satellites, wherein the software application comprises one or more functions for monitoring ground-based activity using sensor resources provided by the satellite platform;
identify an availability of at least the sensor resources present in the plurality of in orbit satellites to support the one or more functions for in orbit monitoring of the ground-based activity;
determine deployment options for deployment of the software application onto the satellite platform to achieve the one or more functions, wherein the one or more deployment options are determined based at least on the deployment requirements and the availability of the sensor resources present in the plurality of in orbit satellites to monitor the ground-based activity; and
based at least on the availability indicating sensor resources provided by the satellite platform being able to achieve all the deployment requirements, provide for presentation to a user at least a first deployment option for deploying the software application to at least one of the plurality of in orbit satellites to achieve the deployment requirements.

19. The apparatus of claim 18 wherein the deployment requirements comprise at least geographic areas of interest for monitoring the ground-based activity using the sensor resources provided by the satellite platform, operation times of interest to monitor the ground-based activity, and sensor requirements to monitor the ground-based activity.

20. The apparatus of claim 18 wherein the program instructions further direct the processing system to:
identify a budget requirement received via the user input; and
determine the deployment options for deployment based at least on the budget requirement, deployment requirements, and the availability of in orbit sensor resources.

* * * * *